United States Patent
Armand

(10) Patent No.: US 11,149,672 B1
(45) Date of Patent: Oct. 19, 2021

(54) REAL-TIME ADAPTABLE STOCHASTIC PRE-IGNITION MITIGATION CONTROL

(71) Applicant: GM GLOBAL TECHNOLOGY OPERATIONS LLC, Detroit, MI (US)

(72) Inventor: Cedric D. Armand, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/952,588

(22) Filed: Nov. 19, 2020

(51) Int. Cl.
| | | |
|---|---|---|
| *F02D 41/14* | (2006.01) | |
| *F02D 41/22* | (2006.01) | |
| *G01L 23/22* | (2006.01) | |
| *F02D 41/24* | (2006.01) | |

(52) U.S. Cl.
CPC ......... *F02D 41/1402* (2013.01); *F02D 41/22* (2013.01); *F02D 41/2422* (2013.01); *F02D 41/2487* (2013.01); *G01L 23/221* (2013.01); *F02D 2200/101* (2013.01); *F02D 2200/1002* (2013.01)

(58) Field of Classification Search
CPC ............. F02D 41/1402; F02D 41/2487; F02D 41/2422; F02D 41/22; F02D 2200/101; F02D 2200/1002; G01L 23/221
See application file for complete search history.

(56) References Cited

U.S. PATENT DOCUMENTS

| | | | | |
|---|---|---|---|---|
| 5,509,268 A | * | 4/1996 | Kuroda .................. | F02D 41/22 60/277 |
| 2013/0035841 A1 | * | 2/2013 | Glugla .................. | F02D 35/027 701/105 |
| 2013/0139786 A1 | * | 6/2013 | Glugla ................ | F02D 41/0002 123/321 |
| 2014/0025278 A1 | * | 1/2014 | Gwidt .................. | F02D 41/402 701/105 |
| 2014/0150759 A1 | * | 6/2014 | Song ...................... | F02M 26/19 123/568.19 |
| 2014/0360179 A1 | * | 12/2014 | Doering .................. | F02B 37/18 60/602 |
| 2015/0159573 A1 | * | 6/2015 | Glugla .................... | F02D 37/02 701/103 |
| 2016/0281631 A1 | * | 9/2016 | Hosono ............... | F02D 41/0235 |
| 2017/0051688 A1 | * | 2/2017 | Glugla .................. | F02D 35/027 |
| 2020/0225119 A1 | * | 7/2020 | Fan ........................ | G01M 15/05 |

FOREIGN PATENT DOCUMENTS

CN  211500811 U  *  9/2020

* cited by examiner

*Primary Examiner* — Joseph J Dallo
(74) *Attorney, Agent, or Firm* — Quinn IP Law

(57) ABSTRACT

A control system includes a knock sensor and a controller. The knock sensor is configured to generate a notification signal by sensing a plurality of engine cylinder events in an engine. The controller is electrically coupled to the knock sensor and configured to detect a plurality of stochastic pre-ignition events in response to the plurality of engine cylinder events, calculate a real-time rate of the plurality of stochastic pre-ignition events, calculate a ratio of the real-time rate to an allowable rate of the engine, and adjust a current allowable torque of the engine in response to the ratio and a rotational speed of the engine.

20 Claims, 2 Drawing Sheets

REAL-TIME ADAPTABLE STOCHASTIC PRE-IGNITION MITIGATION CONTROL

INTRODUCTION

The present disclosure relates to a system and a method for real-time adaptable stochastic pre-ignition smart mitigation control system.

A stochastic pre-ignition (SPI) event in a gasoline-fueled internal combustion engine occurs where an air/fuel mixture in a cylinder ignites before a corresponding spark plug fires. Engine knocking often follows the pre-ignition event. Premature piston failure may result due to reaching a maximum allowable number of stochastic pre-ignition events. A stochastic event is an event that occurs unpredictably. However, allowable engine torque is a means of controlling the occurrence rate of the stochastic pre-ignition events.

What is desired is a technique for controlling the occurrence rate of stochastic pre-ignition events in an adaptable fashion for each engine, vehicle, and customer system.

SUMMARY

A control system is provided herein. The control system includes a knock sensor and a controller. The knock sensor is configured to generate a notification signal by sensing a plurality of engine cylinder events in an engine. The controller is electrically coupled to the knock sensor and configured to detect a plurality of stochastic pre-ignition events in response to the plurality of engine cylinder events, calculate a real-time rate of the plurality of stochastic pre-ignition events, calculate a ratio of the real-time rate to an allowable rate of the engine, and adjust a current allowable torque of the engine in response to the ratio and a rotational speed of the engine.

In one or more embodiments of the control system, the adjustment of the current allowable torque is a lookup of a new allowable torque in a current calculation loop, wherein the new allowable torque is based on the ratio and the rotational speed of the engine, and a reduction of the current allowable torque to a lower allowable torque in response to the new allowable torque being less than a previous allowable torque that was determined in a previous calculation loop.

In one or more embodiments of the control system, the adjustment of the current allowable torque is leaving the current allowable torque unchanged in response to the new allowable torque matching the previous allowable torque.

In one or more embodiments of the control system, the reduction of the current allowable torque is a scaling of the new allowable torque.

In one or more embodiments of the control system, the adjustment of the current allowable torque is a lookup of a new allowable torque in a current calculation loop, wherein the new allowable torque is based on the ratio and the rotational speed of the engine, and an increase of the current allowable torque to a higher allowable torque in response to the new allowable torque being greater than a previous allowable torque that was determined in a previous calculation loop.

In one or more embodiments of the control system, the higher allowable torque is capped at a maximum torque of the engine.

In one or more embodiments, the controller is further configured to wait a given number of the plurality of stochastic pre-ignition events before performing an initial calculation of the real-time rate.

In one or more embodiments of the control system, the allowable rate is based on a maximum number of the plurality of stochastic pre-ignition events that a piston in the engine withstands within an expected lifetime.

In one or more embodiments of the control system, the allowable rate is dependent upon a design of the engine.

A method for adaptable stochastic pre-ignition mitigation control is provided herein. The method includes generating with a knock sensor a notification signal by sensing a plurality of engine cylinder events in an engine, detecting with a controller a plurality of stochastic pre-ignition events in response to the plurality of engine cylinder events, calculating with a controller a real-time rate of the plurality of stochastic pre-ignition events in response to the notification signal, calculating a ratio of the real-time rate to an allowable rate of the engine, and adjusting a current allowable torque of the engine in response to the ratio and a rotational speed of the engine.

In one or more embodiments of the method, the adjusting of the current allowable torque is looking up a new allowable torque in a current calculation loop, wherein the new allowable torque is based on the ratio and the rotational speed of the engine, and reducing the current allowable torque to a lower allowable torque in response to the new allowable torque being less than a previous allowable torque that was determined in a previous calculation loop.

In one or more embodiments of the method, the adjusting of the current allowable torque is leaving the current allowable torque unchanged in response to the new allowable torque matching the previous allowable torque.

In one or more embodiments of the method, the reducing of the current allowable torque is a scaling of the new allowable torque.

In one or more embodiments of the method, the adjusting of the current allowable torque is looking up a new allowable torque in a current calculation loop, wherein the new allowable torque is based on the ratio and the rotational speed of the engine, increasing the current allowable torque to a higher allowable torque in response to the new allowable torque being greater than a previous allowable torque that was determined in a previous calculation loop.

In one or more embodiments of the method, the higher allowable torque is capped at a maximum torque of the engine.

In one or more embodiments, the method further includes waiting a given number of the plurality of stochastic pre-ignition events before performing an initial calculation of the real-time rate.

A vehicle is provided herein. The vehicle includes an engine, a knock sensor, and a controller. The knock sensor is coupled to the engine and configured to generate a notification signal by sensing a plurality of engine cylinder events in the engine. The controller is electrically coupled to the knock sensor and is configured to detect a plurality of stochastic pre-ignition events in response to the plurality of engine cylinder events, calculate a real-time rate of the plurality of stochastic pre-ignition events, calculate a ratio of the real-time rate to an allowable rate of the engine, and adjust a current allowable torque of the engine in response to the ratio and a rotational speed of the engine.

In one or more embodiments of the vehicle, the adjustment of the current allowable torque is a lookup of a new allowable torque in a current calculation loop, wherein the new allowable torque is based on the ratio and the rotational speed of the engine, and a reduction of the current allowable torque to a lower allowable torque in response to the new allowable torque being less than a previous allowable torque that was determined in a previous calculation loop.

In one or more embodiments of the vehicle, the adjustment of the current allowable torque is a lookup of a new allowable torque in a current calculation loop, wherein the new allowable torque is based on the ratio and the rotational speed of the engine, and an increase of the current allowable torque to a higher allowable torque in response to the new allowable torque being greater than a previous allowable torque that was determined in a previous calculation loop.

In one or more embodiments of the vehicle, the adjustment of the current allowable torque is a lookup of a new allowable torque in a current calculation loop, wherein the new allowable torque is based on the ratio and the rotational speed of the engine, and leaving the current allowable torque unchanged in response to the new allowable torque matching a previous allowable torque that was determined in a previous calculation loop.

The above features and advantages and other features and advantages of the present disclosure are readily apparent from the following detailed description of the best modes for carrying out the disclosure when taken in connection with the accompanying drawings.

DETAILED DESCRIPTION

In one or more embodiments of the disclosure, a control system is provided that maintains a sustainable rate of stochastic pre-ignition (SPI) events in an engine. The sustainable rate is achieved by modulating an allowable torque of the engine. The sustainable rate generally provides that no piston in the engine may fail due to reaching a maximum allowable number of stochastic pre-ignition events. In one or more embodiments, the control system may be adapted to each engine cylinder individual stochastic pre-ignition rate for an individual engine of a customer. The adaptation is performed in real-time and modulates the allowable torque proportionally.

Figure 1:
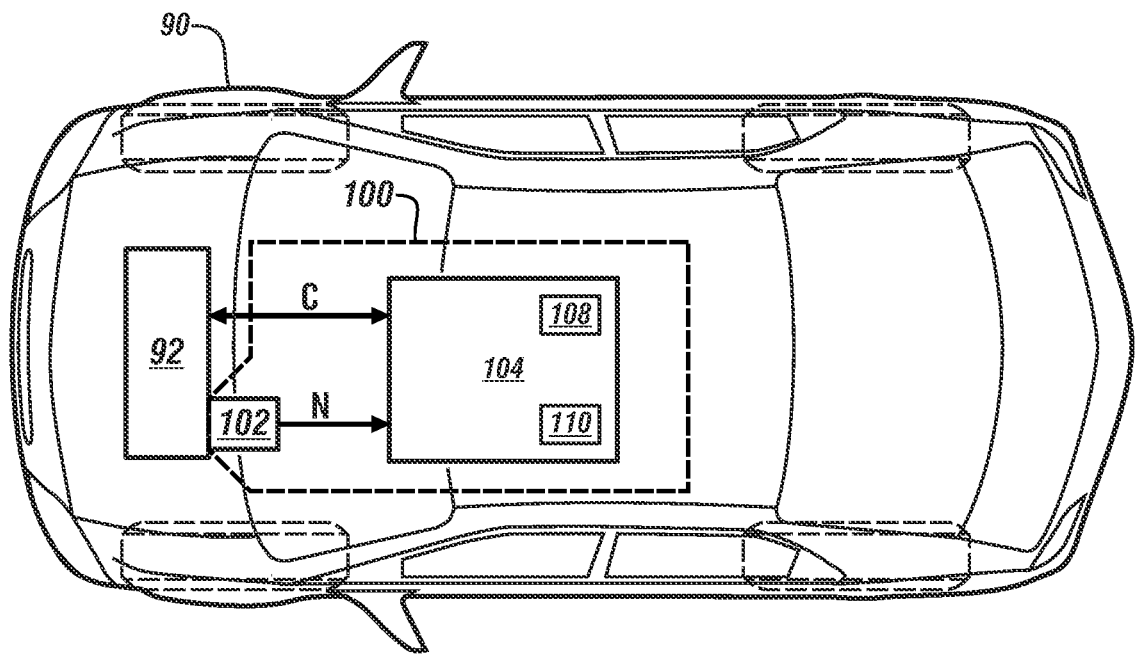
FIG. 1 is a schematic plan diagram illustrating a context of a vehicle in accordance with one or more exemplary embodiments.

Referring to FIG. 1, a schematic plan diagram illustrating a context of a vehicle 90 is shown in accordance with one or more exemplary embodiments. The vehicle 90 generally comprises an engine 92 and a control system 100. The control system 100 includes one or more knock sensors 102 (one shown) and a controller 104. The controller 104 generally implements an adaptable stochastic pre-ignition mitigation control 108 and includes calibration data 110.

A control signal (e.g., C) may be exchanged between the controller 104 and the engine 92. The control signal C carries control torque information from the controller 104 to the engine 92. The control signal C may also convey engine speed information from the engine 92 to the controller 104.

The control signal C may also convey engine cylinder timing information from the engine 92 to the controller 104. A notification signal (e.g., N) may be generated by the knock sensor 102 and transferred to the controller 104. The notification signal N conveys engine cylinder event information that may be processed within controller 104 to determine when an engine stochastic pre-ignition event has occurred.

The vehicle 90 may include, but is not limited to, mobile objects such as automobiles, trucks, motorcycles, boats, trains and/or aircraft. In some embodiments, the vehicle 90 may include stationary objects such as billboards, kiosks, power back-up systems (e.g., uninterruptible power supplies) and/or marquees. Other types of vehicles 90 may be implemented to meet the design criteria of a particular application.

The engine 92 may be implemented as a gasoline-fueled internal combustion engine. The engine 92 is operational to generate a torque that powers the vehicle 90. The torque generated by the engine 92 is adjustable by the controller 104 via the control signal C. At random times, the engine 92 experiences an engine cylinder event of interest where an air/fuel mixture in a cylinder of the engine 92 ignites before a corresponding spark plug fires.

The control system 100 may be operable to continuously calculate a real-time stochastic pre-ignition rate (e.g., the SPI events per mile) and compare the real-time stochastic pre-ignition rate (real-time rate) with a calculated allowable stochastic pre-ignition rate (allowable rate). In various embodiments, the control system 100 calculates the real-time rate of the stochastic pre-ignition events continuously, calculates a ratio of the real-time rate to an allowable rate of the engine 92, and adjust a current allowable torque of the engine 92 in response to the ratio and a rotational speed of the engine.

The allowable rate is generally an average of a maximum number of the SPI events that a piston may withstand without failing over the expected life of the vehicle 90. In response to the real-time rate being too high, the control system 100 reduces the allowable torque of the engine 92 by a calculated factor to reduce the real-time rate to match the allowable rate. In response to the real-time rate being lower than the allowable rate, the control system increases the allowable torque of the engine 92 to make the higher torque available to the customer operating the vehicle 90.

The knock sensor 102 is coupled to the engine 92. The knock sensor 102 may be operational to sense each time the engine 92 experiences an engine cylinder event of interest (e.g., vibrations) that may indicate an SPI event. The engine cylinder timing information is conveyed to the controller 104 in the control signal C. The engine cylinder event information is conveyed to the controller 104 in the notification signal N. In various embodiments, an individual knock sensor 102 may be implemented for each bank of cylinders in the engine 92. In other embodiments, a corresponding knock sensor 102 may be implemented for each cylinder in the engine 92. In some embodiments, a single knock sensor 102 may be implemented for the engine 92.

The controller 104 may be implemented as a gasoline-fueled internal combustion engine control circuit (or device). The controller 104 is electrically coupled to the knock sensor 102. The controller 104 is configured to determine the occurrences of the stochastic pre-ignition events based on the engine cylinder timing information received in the control signal C and the engine cylinder information received in the notification signal N, calculate the real-time rate of the stochastic pre-ignition events in the engine 92, calculate a ratio of the real-time rate to the allowable rate of the engine 92, and adjust a current allowable torque of the engine 92 in response to the ratio and the rotational speed of the engine. In various embodiments, the controller 104 may include one or more processors and memory. The one or more processors may be operational to execute software used to implement the adaptable stochastic pre-ignition mitigation control 108. The controller 104 may be implemented in hardware and/or software executing on the hardware.

In some embodiments, the controller 104 executes a stochastic pre-ignition detection process that is configured to determine when the stochastic pre-ignition events occur and do not occur. The stochastic pre-ignition detection process generally implements a digital signal processing technique that is based on an intensity of the vibrations. The real-time rate calculation begins after the vehicle 90 has been driven a predetermined number of miles and/or a given number of stochastic pre-ignition events occur. This initial delay allows time for a realistic stochastic pre-ignition rate to be established. The given number (e.g., a statistically significant number) of the stochastic pre-ignition events for the cylinders may be a calibration parameter of the engine 92. For example, a statistically significant number of the stochastic pre-ignition events may be 30 events for a first engine type, 500 events for a second engine type, and so on.

The calibration data 110 may include multiple data items that correspond to the engine 92 being controlled. The calibration data 110 may include a maximum number of the SPI events until failure (SPI-events-until-failure limit), a target vehicle mileage, and the allowable torque. The SPI-events-until-failure limit defines a calibratable input to the control system 100 that represents a maximum number of the SPI events that the piston in the engine 92 may withstand before failing within an expected lifetime of the vehicle 90. The SPI-events-until-failure limit generally depends on engine piston design and therefore adapts to the specific engine 92. The target vehicle mileage defines a calibratable input to the control system 100 that represents the expected life of the vehicle 90. The target vehicle mileage may be in excess of 100,000 miles (e.g., typically 165,000 miles). The target vehicle mileage depends on the vehicle application and therefore adapts to specific vehicle lines. The allowable torque limits the maximum engine torque as a function of a ratio of the real-time rate and the allowable rate, and the rotational speed of the engine. Other types of the calibration data 110 may be implemented to meet the design criteria of a particular application.

The probability of the engine 92 experiencing an SPI event is based on the engine rotational speed and the engine torque. An exemplary analytical normalized representation of how the real-time rate scales with engine speed (revolutions per minute (RPM)) and engine torque (Newton-meters (Nm)) is provided in Table 1 as follows:

TABLE 1

| Torque | Engine Rotational Speed (RPM) | | | | | | | |
|---|---|---|---|---|---|---|---|---|
| (Nm) | 1500 | 2000 | 2500 | 3000 | 3500 | 4000 | 4500 | 5000 |
| 400 | 8 | 7 | 6 | 5 | 4 | 3 | 2 | 1 |
| 375 | 7 | 6 | 5 | 4 | 3 | 2 | 1 | 0 |
| 350 | 6 | 5 | 4 | 3 | 2 | 1 | 0 | 0 |
| 325 | 5 | 4 | 3 | 2 | 1 | 0 | 0 | 0 |
| 300 | 4 | 3 | 2 | 1 | 0 | 0 | 0 | 0 |
| 275 | 3 | 2 | 1 | 0 | 0 | 0 | 0 | 0 |
| 250 | 2 | 1 | 0 | 0 | 0 | 0 | 0 | 0 |
| 225 | 1 | 0 | 0 | 0 | 0 | 0 | 0 | 0 |

TABLE 1-continued

| Torque | Engine Rotational Speed (RPM) | | | | | | | |
|---|---|---|---|---|---|---|---|---|
| (Nm) | 1500 | 2000 | 2500 | 3000 | 3500 | 4000 | 4500 | 5000 |
| 200 | 0 | 0 | 0 | 0 | 0 | 0 | 0 | 0 |
| 175 | 0 | 0 | 0 | 0 | 0 | 0 | 0 | 0 |
| 150 | 0 | 0 | 0 | 0 | 0 | 0 | 0 | 0 |

An entry E of zero means that no SPI events should take place. An entry E of greater than 1 (e.g., E=7) means that the SPI event is E times more likely to have an SPI event than an entry of 1.

The normalized representation of how the real-time rate scales with engine speed (revolutions per minute (RPM)) and engine torque (Newton-meters (Nm)) being analogous to SPI Ratio, Table 2 is generated by translating and transposing the z-data and y-axis in Table 1. At a calculated SPI ratio, the current allowable torque (Newton-meters) as a function of engine rotational speed (revolutions per minute) may be determined from the calibration Table 2 as follows:

TABLE 2

| SPI | Engine Rotational Speed (RPM) | | | | | | | |
|---|---|---|---|---|---|---|---|---|
| Ratio | 1500 | 2000 | 2500 | 3000 | 3500 | 4000 | 4500 | 5000 |
| 100 | 200 | 225 | 250 | 275 | 300 | 325 | 350 | 375 |
| 10 | 225 | 250 | 275 | 300 | 325 | 350 | 375 | 400 |
| 5 | 250 | 275 | 300 | 325 | 350 | 375 | 400 | 400 |
| 3.3 | 275 | 300 | 325 | 350 | 375 | 400 | 400 | 400 |
| 2.5 | 300 | 325 | 350 | 375 | 400 | 400 | 400 | 400 |
| 2.0 | 325 | 350 | 375 | 400 | 400 | 400 | 400 | 400 |
| 1.7 | 350 | 375 | 400 | 400 | 400 | 400 | 400 | 400 |
| 1.4 | 375 | 400 | 400 | 400 | 400 | 400 | 400 | 400 |
| 1.3 | 400 | 400 | 400 | 400 | 400 | 400 | 400 | 400 |
| 1.1 | 400 | 400 | 400 | 400 | 400 | 400 | 400 | 400 |
| 1.0 | 400 | 400 | 400 | 400 | 400 | 400 | 400 | 400 |

In the example, a current allowable torque of 400 Nm may be the maximum torque of the engine 92. At a given engine rotational speed, as the SPI ratio increases (e.g., moving up in the table), the current allowable torque generally decreases. At a given SPI ratio, an increase (e.g., moving right in the table) in the rotational speed of the engine 92 results in an increase in the current allowable torque. Other maximum torques may be implemented to meet the design criteria of a particular application.

The adaptable stochastic pre-ignition mitigation control 108 may be embedded within the controller 104. The adaptable stochastic pre-ignition mitigation control 108 may implement a method (or process) that maintains a sustainable rate of the SPI events of the engine 92. In some embodiments, the adaptable stochastic pre-ignition mitigation control 108 may include the stochastic pre-ignition detection process to detect each occurrence of the stochastic pre-ignition events. In various embodiments, the adaptable stochastic pre-ignition mitigation control 108 may be implemented as dedicated hardware circuitry, software executing within the controller 104, or a combination of dedicated hardware and executable software.

The adaptable stochastic pre-ignition mitigation control 108 may calculate the allowable rate, the real-time rate, and a stochastic pre-ignition ratio (SPI ratio) that are used to control the torque of the engine 92. The allowable rate may be the number of the SPI events that the piston in the engine 92 may withstand per mile such that the piston will not fail before the vehicle 90 reaches an expected life. The allowable rate may be calculated as the SPI-events-until-failure limit divided by the target vehicle mileage.

The real-time rate is a current number of the SPI events that a piston experiences per mile (e.g., an average number of events per mile). The real-time rate is calculated as a number of the SPI events that have been detected divided by a current vehicle milage.

The SPI ratio is a quantitative relation between the real-time rate and the allowable rate. The ratio represents a factor with which the real-time rate may be reduced by in order for the piston to survive through the expected life of the vehicle 90. The SPI ratio is calculated as the real-time rate divided by the allowable rate.

Figure 2:
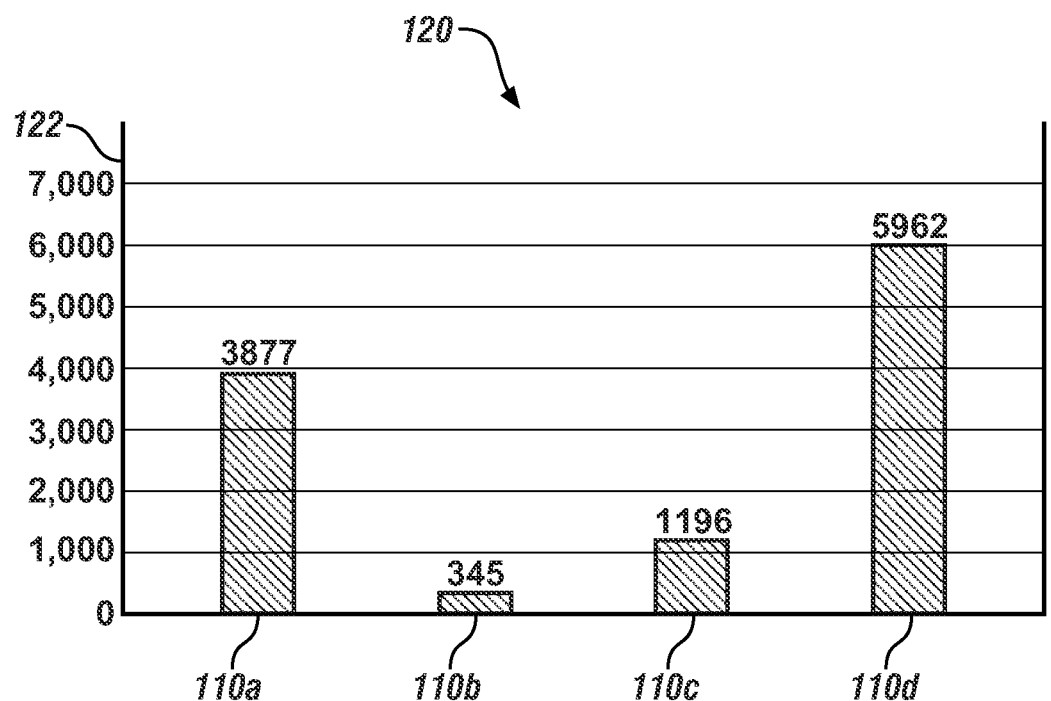
FIG. 2 is a graph of a stochastic pre-ignition events-until-failure limit by engine type in accordance with one or more exemplary embodiments.

Referring to FIG. 2, a graph 120 of an example of the stochastic pre-ignition events-until-failure limit by engine type is shown in accordance with one or more exemplary embodiments. A scale 122 of the Y axis of the graph 120 illustrates example values of the SPI-events-until-failure limit. The X axis of the graph 120 illustrates the calibration data 110a-110d for several different types of engines 92. The calibration data 110a-110d depends on engine piston design and therefore is adapted to the specific engines 92. The graph 120 generally illustrates that the SPI-events-until-failure limits may range from approximately 345 to approximately 5962. Other SPI-events-until-failure limits may exist in other types of engines 92.

Figure 3:
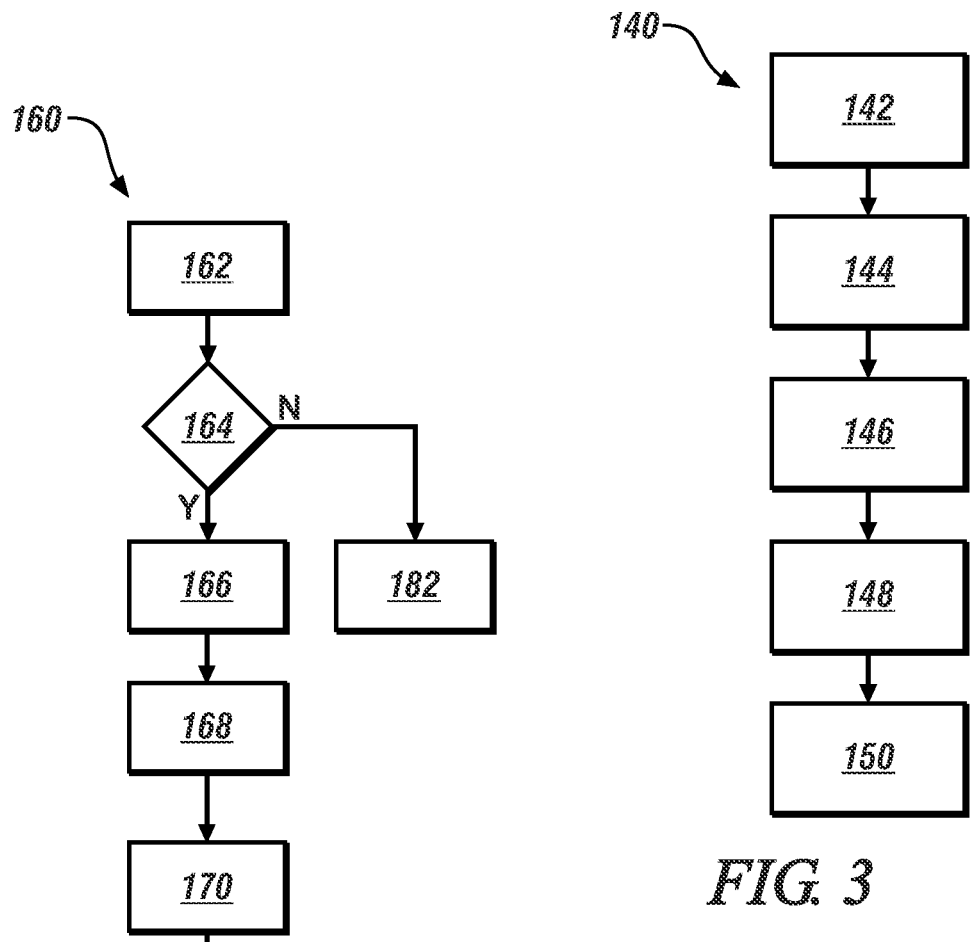
FIG. 3 is a flow diagram of a method of stochastic pre-ignition event detection in accordance with one or more exemplary embodiments.

Referring to FIG. 3, a flow diagram of an example method 140 of stochastic pre-ignition event detection is shown in accordance with one or more exemplary embodiments. The method (or process) 140 is implemented in the knock sensor 102 and the controller 104. The method 140 generally includes a step 142, a step 144, a step 146, a step 148, and a step 150.

In the step 142, the knock sensor 102 may sense a mechanical resonance (e.g., vibrations) of an engine cylinder event of interest in the engine 92 and generate corresponding information in the notification signal N. The notification signal N may convey the information as a voltage, a current, a frequency and/or a phase. Where the knock sensor 102 is implemented as an active sensor, the engine cylinder event of interest information may be filtered, processed, modulated, and/or amplified in the step 144. In step 146, the knock sensor 102 sends the information to controller 104 in the notification signal N and the engine 92 sends cylinder timing information to controller 104 in the control signal C. In step 148, the controller 104 executes a stochastic pre-ignition digital signal processing detection process that is configured to determine when the stochastic pre-ignition events occur and do not occur. In step 150, the controller 104 stores the stochastic pre-ignition event occurrence information.

Figure 4:
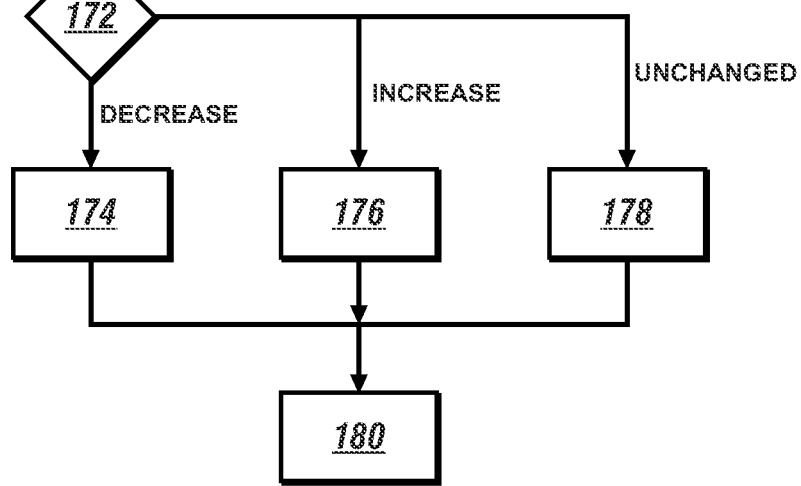
FIG. 4 is a flow diagram of a method that maintains a sustainable rate of the stochastic pre-ignition events in an engine in accordance with one or more exemplary embodiments.

Referring to FIG. 4, a flow diagram of an example method 160 that maintains a sustainable rate of the stochastic pre-ignition events in the engine 92 is shown in accordance with one or more exemplary embodiments. The method (or process) 160 is implemented in the control system 100. The method 160 includes a step 162, a step 164, a step 166, a step 168, a step 170, a step 172, a step 174, a step 176, and a step 180. The sequence of steps is shown as a representative example. Other step orders may be implemented to meet the criteria of a particular application.

In the step 162, the controller 104 samples the stored stochastic pre-ignition event occurrence information. The controller 104 subsequently determines in the step 164 if the given number of initial stochastic pre-ignition events has taken place and the vehicle 90 has driven the initial predetermined number of miles. If no, the method 160 may proceed to the step 182 where no further action is taken. The controller 104 subsequently repeats method 160 in a next calculation loop. In various embodiments, the calculation loop is executed each cylinder event.

If the given number of initial stochastic pre-ignition events have already taken place and the vehicle 90 has driven the initial predetermined number of miles in the step 164, the controller 104 calculates the real-time rate in the step 166. In the step 168, the SPI ratio is generated by the controller 104 based on the real-time rate and the allowable rate of the SPI events.

The current SPI ratio and the current rotational speed (revolutions per minute) of the engine 92 are used to lookup a new allowable torque, as demonstrated in a calibration Table 2 below, in the step 170. The controller 104 checks in the step 172 if the new allowable torque is greater than, less than, or matches the previous allowable torque that was determined in the previous calculation loop. In response to the new allowable torque having decreased relative to the previous allowable torque, the controller 104 reduces the current allowable torque commanded to the engine 92 to a lower allowable torque in the step 174 in an attempt to reduce and/or eliminate future SPI events. The lower allowable torque is based on the calibration Table 2 lookup using current SPI ratio and current rotational speed (revolutions per minute) of the engine 92. For example, the lower allowable torque may be a scaled version of the new allowable torque. In the step 180, the previous allowable torque is updated to the current (lower) allowable torque. The controller 104 subsequently repeats method 160 in the next calculation loop.

In response to determining in the step 172 that the new allowable torque has increased relative to the previous allowable torque, the controller 104 increases the current allowable torque commanded to the engine 92 to a higher allowable torque in the step 176. The higher allowable torque is based on the calibration Table 2 lookup using current SPI ratio and current rotational speed (revolutions per minute) of the engine 92. For example, the higher allowable torque may be a scaled version of the new allowable torque. The higher allowable torque is generally capped at a maximum allowable torque of the engine 92. In various embodiments, the scaled increase in the current allowable torque determined in the step 176 is generally smaller than the scaled decrease in the current allowable torque determined in the step 174. The asymmetrical scaling may slow an oscillation in the control of the current allowable torque presented to the engine 92. In the step 180, the previous allowable torque is updated to the current (higher) allowable torque. The controller 104 subsequently repeats method 160 in the next calculation loop.

In response to determining in the step 172 that the allowable torque has stayed the same as the previously allowable torque, the controller 104 may maintain the current allowable torque unchanged in the step 178. The current allowable torque is based on the calibration Table 2 lookup using current SPI ratio and current rotational speed (revolutions per minute) of the engine 92. In the step 180, the previous allowable torque is updated to the current (same) allowable torque. The controller 104 subsequently repeats method 160 in the next calculation loop.

In various embodiments, the control system 100 generally adapts torque control of the engine 92 to each customer's individual SPI rate in real-time. The controller 104 continuously calculates the real-time rate (e.g., SPI events per mile). The allowable rate and a maximum number of SPI events that a piston may withstand without failing before the expected life of the vehicle 90 are used as calibration information by the controller 104 in calculating the current allowable torque. Based on the real-time rate, the controller 104 calculates the SPI ratio (e.g., the ratio of the real-time rate to the allowable rate) and proportionally modulates the allowable engine torque by the SPI ratio. The amount of torque reduction may be scaled based on the real-time rate. Higher values of the real-time rate may result in higher amounts of torque reduction.

Various embodiments of the control system 100 provide continuous real-time rate monitoring and acts to reduce the current allowable torque while the real-time rate is more than the allowable rate. A length of time of the torque adjustments may be continuous as the real-time rate is updated continuously. The torque adjustments are customizable to a particular engine 92 based on the calibration data 110. Therefore, the control system 100 adapts the torque control to the particular engine 92 of the customer. The control system 100 thereby prevents premature piston failures in an intelligent manner that is customized to the situation of each customer.

While the best modes for carrying out the disclosure have been described in detail, those familiar with the art to which this disclosure relates will recognize various alternative designs and embodiments for practicing the disclosure within the scope of the appended claims.

What is claimed is:

1. A control system comprising:
   a knock sensor configured to generate a notification signal by sensing a plurality of engine cylinder events in an engine; and
   a controller electrically coupled to the knock sensor and configured to detect a plurality of stochastic pre-ignition events in response to the plurality of engine cylinder events, calculate a real-time rate of the plurality of stochastic pre-ignition events, calculate a ratio of the real-time rate of the plurality of stochastic pre-ignition events to an allowable rate of the plurality of stochastic pre-ignition events of the engine, and adjust a current allowable torque of the engine in response to the ratio and a rotational speed of the engine, wherein the allowable rate of the plurality of stochastic pre-ignition events of the engine is a predetermined number of the plurality of stochastic pre-ignition events that a piston in the engine can withstand per mile.

2. The control system according to claim 1, wherein the adjustment of the current allowable torque is:
   a lookup of a new allowable torque in a current calculation loop, wherein the new allowable torque is based on the ratio and the rotational speed of the engine; and
   a reduction of the current allowable torque to a lower allowable torque in response to the new allowable torque being less than a previous allowable torque that was determined in a previous calculation loop.

3. The control system according to claim 2, wherein the adjustment of the current allowable torque is:
   leaving the current allowable torque unchanged in response to the new allowable torque matching the previous allowable torque.

4. The control system according to claim 2, wherein the reduction of the current allowable torque is a scaling of the new allowable torque based on the rotational speed of the engine.

5. The control system according to claim 1, wherein the adjustment of the current allowable torque is:
   a lookup of a new allowable torque in a current calculation loop, wherein the new allowable torque is based on the ratio and the rotational speed of the engine; and
   an increase of the current allowable torque to a higher allowable torque in response to the new allowable torque being greater than a previous allowable torque that was determined in a previous calculation loop.

6. The control system according to claim 5, wherein the higher allowable torque is capped at a maximum torque of the engine.

7. The control system according to claim 1, wherein the controller is further configured to wait a given number of the plurality of stochastic pre-ignition events before performing an initial calculation of the real-time rate of the plurality of stochastic pre-ignition events.

8. The control system according to claim 1, wherein the allowable rate of the plurality of stochastic pre-ignition events of the engine is based on a maximum number of the plurality of stochastic pre-ignition events that the piston in the engine withstands within an expected lifetime.

9. The control system according to claim 1, wherein the allowable rate of the plurality of stochastic pre-ignition events of the engine is dependent upon a design of the engine.

10. A method for adaptable stochastic pre-ignition mitigation control, comprising:
    generating with a knock sensor a notification signal by sensing a plurality of engine cylinder events in an engine;
    detecting with a controller a plurality of stochastic pre-ignition events in response to the plurality of engine cylinder events;
    calculating a real-time rate of the plurality of stochastic pre-ignition events;
    calculating a ratio of the real-time rate of the plurality of stochastic pre-ignition events to an allowable rate of the plurality of stochastic pre-ignition events of the engine; and
    adjusting a current allowable torque of the engine in response to the ratio and a rotational speed of the engine, wherein the allowable rate of the plurality of stochastic pre-ignition events of the engine is a predetermined number of the plurality of stochastic pre-ignition events that a piston in the engine can withstand per mile.

11. The method according to claim 10, wherein the adjusting of the current allowable torque is:
    looking up a new allowable torque in a current calculation loop, wherein the new allowable torque is based on the ratio and the rotational speed of the engine; and
    reducing the current allowable torque to a lower allowable torque in response to the new allowable torque being less than a previous allowable torque that was determined in a previous calculation loop.

12. The method according to claim 11, wherein the adjusting of the current allowable torque is:
    leaving the current allowable torque unchanged in response to the new allowable torque matching the previous allowable torque.

13. The method according to claim 11, wherein the reducing of the current allowable torque is a scaling of the new allowable torque based on the rotational speed of the engine.

14. The method according to claim 11, wherein the adjusting of the current allowable torque is:

looking up a new allowable torque in a current calculation loop, wherein the new allowable torque is based on the ratio and the rotational speed of the engine; and increasing the current allowable torque to a higher allowable torque in response to the new allowable torque being greater than a previous allowable torque that was determined in a previous calculation loop.

15. The method according to claim 14, wherein the higher allowable torque is capped at a maximum torque of the engine.

16. The method according to claim 11, further comprising:

waiting a given number of the plurality of stochastic pre-ignition events before performing an initial calculation of the real-time rate of the plurality of stochastic pre-ignition events.

17. A vehicle comprising:

an engine;

a knock sensor coupled to the engine and configured to generate a notification signal by sensing a plurality of engine cylinder events in the engine; and a controller electrically coupled to the knock sensor and configured to detect a plurality of stochastic pre-ignition events in response to the plurality of engine cylinder events, calculate a real-time rate of the plurality of stochastic pre-ignition events, calculate a ratio of the real-time rate of the plurality of stochastic pre-ignition events to an allowable rate of the plurality of stochastic pre-ignition events of the engine, and adjust a current allowable torque of the engine in response to the ratio and a rotational speed of the engine, wherein the allowable rate of the plurality of stochastic pre-ignition events of the engine is a predetermined number of the plurality of stochastic pre-ignition events that a piston in the engine can withstand per mile.

18. The vehicle according to claim 17, wherein the adjustment of the current allowable torque is:

a lookup of a new allowable torque in a current calculation loop, wherein the new allowable torque is based on the ratio and the rotational speed of the engine; and a reduction of the current allowable torque to a lower allowable torque in response to the new allowable torque being less than a previous allowable torque that was determined in a previous calculation loop.

19. The vehicle according to claim 17, wherein the adjustment of the current allowable torque is:

a lookup of a new allowable torque in a current calculation loop, wherein the new allowable torque is based on the ratio and the rotational speed of the engine; and an increase of the current allowable torque to a higher allowable torque in response to new allowable torque being greater than a previous allowable torque that was determined in a previous calculation loop.

20. The vehicle according to claim 17, wherein the adjustment of the current allowable torque is:

a lookup of a new allowable torque in a current calculation loop, wherein the new allowable torque is based on the ratio and the rotational speed of the engine; and leaving the current allowable torque unchanged in response to the new allowable torque matching a previous allowable torque that was determined in a previous calculation loop.

* * * * *